United States Patent
Koga

(10) Patent No.: US 11,041,792 B2
(45) Date of Patent: Jun. 22, 2021

(54) MEASURING APPARATUS

(71) Applicant: MITUTOYO CORPORATION, Kanagawa (JP)

(72) Inventor: Tetsuya Koga, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 169 days.

(21) Appl. No.: 16/222,227

(22) Filed: Dec. 17, 2018

(65) Prior Publication Data

US 2019/0187033 A1 Jun. 20, 2019

(30) Foreign Application Priority Data

Dec. 20, 2017 (JP) .............................. JP2017-243378

(51) Int. Cl.
 *G01N 3/42* (2006.01)
 *F16F 3/02* (2006.01)

(52) U.S. Cl.
 CPC .............. *G01N 3/42* (2013.01); *F16F 3/023* (2013.01); *F16F 2228/066* (2013.01); *F16F 2230/0023* (2013.01); *F16F 2232/08* (2013.01); *F16F 2234/06* (2013.01); *F16F 2236/04* (2013.01); *F16F 2238/022* (2013.01); *G01N 2203/0035* (2013.01)

(58) Field of Classification Search
 CPC .................................. G01N 3/42; F16F 3/023
 USPC ............................................................ 73/81
 See application file for complete search history.

(56) References Cited

U.S. PATENT DOCUMENTS

| 4,445,367 A * | 5/1984 | Goldsmid ................ G01N 3/42 374/45 |
| 9,139,168 B2 * | 9/2015 | Jeon ........................ B60T 7/042 |
| 9,291,538 B2 * | 3/2016 | Sawa ....................... G01N 3/42 |
| 2003/0177853 A1 * | 9/2003 | Cho ...................... B81B 3/0051 74/96 |

(Continued)

FOREIGN PATENT DOCUMENTS

| JP | 3332362 B2 | 7/2002 |
| JP | 2004108959 A * | 4/2004 |

OTHER PUBLICATIONS

English translation of JP2004108959 from worldwide.espacenet.com, accessed Aug. 31, 2020.*

(Continued)

*Primary Examiner* — Nimeshkumar D Patel
*Assistant Examiner* — Jean F Morello
(74) *Attorney, Agent, or Firm* — Greenblum & Bernstein, P.L.C.

(57) ABSTRACT

Utilizing a load generated by a non-linear spring, a spring constant of which increases as an amount of deformation increases, a measuring apparatus presses an indenter against a material surface and evaluates material characteristics. The measuring apparatus includes: an actuator that causes the non-linear spring to deform; a scale that measures the amount of deformation of the non-linear spring when the non-linear spring is deformed; and a controller that stores non-linear spring characteristic data for reciprocally calculating the amount of deformation and the load, and that drives the actuator based on the amount of deformation and the non-linear spring characteristic data such that the load reaches a target load.

5 Claims, 7 Drawing Sheets

(56) References Cited

U.S. PATENT DOCUMENTS

| | | | | |
|---|---|---|---|---|
| 2006/0288763 A1* | 12/2006 | Tsujii | .................. | G01N 3/42 |
| | | | | 73/81 |
| 2009/0056427 A1* | 3/2009 | Hansma | ............... | A61B 5/4504 |
| | | | | 73/82 |
| 2009/0260427 A1* | 10/2009 | Woirgard | ............. | G01Q 60/366 |
| | | | | 73/85 |
| 2016/0018308 A1* | 1/2016 | Kataoka | .................. | G01N 3/42 |
| | | | | 73/82 |
| 2016/0258502 A1* | 9/2016 | Cleveland | ................. | F16F 3/02 |
| 2018/0027983 A1* | 2/2018 | DeMoss | ............... | A47C 27/064 |
| 2020/0089269 A1* | 3/2020 | Adoline | .................. | F16F 3/02 |

OTHER PUBLICATIONS

English translation of JP3332362 accessed from iq.ip.com Mar. 5, 2021.*

* cited by examiner

MEASURING APPARATUS

CROSS-REFERENCE TO RELATED APPLICATIONS

The present application claims priority under 35 U.S.C. § 119 of Japanese Application No. 2017-243378, filed on Dec. 20, 2017, the disclosure of which is expressly incorporated by reference herein in its entirety.

BACKGROUND OF THE INVENTION

1. Field of the Invention

The present invention relates to a measuring apparatus, and particularly relates to a measuring apparatus that utilizes deformation of a spring to press an indenter against a material surface and evaluate material characteristics.

2. Description of Related Art

Conventionally, a measuring apparatus is known that measures characteristics of a material by pressing an indenter against the material with a predetermined force. For example, a hardness tester is known that measures the hardness of a material by pressing an indenter against a surface of the material and forming an indentation. Also, a strength tester is known that measures the strength of a material by pressing an indenter against a surface of the material and fracturing the material.

An example of a conventional measuring apparatus is Japanese Patent No. 3,332,362. Japanese Patent No. 3,332,362 describes a hardness measuring apparatus such as the one described above, provided with a load-applying control mechanism that prevents overshooting.

FIG. 1 is a schematic view illustrating a typical structure of a conventional measuring apparatus. The measuring apparatus includes a stage on which a work piece is placed; a frame that extends above the stage; an actuator that is supported by the frame; a spring with a first end touching the actuator and a second end holding an indenter; and a scale measuring deformation of the spring. The actuator and the spring are arranged such that an extension/retraction axis of each coincides with the other. When the actuator extends, the spring contracts and the indenter is pressed against the work piece. The scale measures an amount of deformation of the spring at this point, and calculates the load applied to the work piece by multiplying the amount of deformation by a spring constant.

The spring controls the load that is applied to the work piece through the following two effects:
(1) Convert Deformation to Force.

An amount of change in the shape of the spring (amount of deformation) and a load are in substantially a proportional relationship. Therefore, when the actuator is controlled such that the amount of deformation of the spring reaches a predetermined value, a predetermined load can be applied to the work piece. Therefore, the softer the spring (the greater the amount of deformation per load), the higher the accuracy of load control.
(2) Prevent Rapid Changes in Force Due to Deformation of the Work Piece or the Like.

Even in a case where the work piece deforms due to the load applied to the surface of the work piece and the surface of the work piece with which the indenter is in contact shifts in a direction away from the indenter, the spring deforms and the indenter follows the surface. Specifically, the spring continues to press the indenter against the surface of the work piece. At this point, the load increases or decreases in accordance with the amount of deformation of the spring, but never drastically decreases. Meanwhile, when a configuration is chosen in which there is no spring and the actuator provides the load directly, in a case where the work piece deforms or shifts, the actuator may be unable to follow and the load may drastically decrease. In particular, the actuator has difficulty following deformation that is difficult to predict, such as growth of a crack in a work piece.

Effects (1) and (2) described above, which are imparted by the spring of the measuring apparatus, grow stronger as the spring grows softer (as the spring constant becomes lower). Meanwhile, as the spring grows softer, the amount of deformation and an actuator stroke required to achieve a desired load grow larger. When the amount of deformation of the spring and the actuator stroke become large, the spring and actuator become bulky, and the measuring apparatus also becomes bulky. This also increases constraints on the design of the measuring apparatus. In addition, when a work piece fractures and the spring returns to its initial shape (free length), there is a high possibility that the indenter will reach the stage and cause damage. Also, when the amount by which the spring can be deformed (stroke) grows larger, the energy stored in the spring increases, and therefore when the work piece fractures, there is a greater risk that the work piece or stage may shatter, and that fragments may cause injury to a person or object. Therefore, conventionally, it has been necessary to select an appropriate spring hardness (spring constant) while weighing these effects and challenges.

Furthermore, the appropriate spring hardness (spring constant) depends on the material to be measured and the purpose of the measurement. For example, when a material is soft, a small load is applied and therefore a softer spring is suitable. Meanwhile, when a material is hard, a large load must be applied and therefore a harder spring is suitable. On the other hand, in order to detect a weak force in the moment that the indenter makes contact with the work piece, a softer spring is suitable.

Given these circumstances, conventionally, a plurality of measuring apparatuses have been provided depending on a range of forces that can be controlled, the hardness of a work piece to be measured, the purpose of a measurement, the degree of accuracy required, and the like. Using a different one of these measuring apparatuses depending on the application is extremely burdensome as well as costly.

SUMMARY OF THE INVENTION

In order to resolve the above-noted issues, the present invention provides a measuring apparatus that utilizes deformation of a spring to press an indenter against a material surface and evaluate material characteristics, where the measuring apparatus can control force over a broad range with a high degree of accuracy, and yet is compact.

A measuring apparatus according to the present invention presses an indenter against a material surface and evaluates material characteristics, and includes: a non-linear spring in which a spring constant increases as an amount of deformation increases, and the deformation generates a load that presses the indenter against the material surface; an actuator that causes the non-linear spring to deform; a scale that measures the amount of deformation of the non-linear spring when the non-linear spring is deformed; and a controller that stores non-linear spring characteristic data for reciprocally calculating the amount of deformation and the load, and that drives the actuator based on the amount of deformation and the non-linear spring characteristic data such that the load reaches a target load. In the measuring apparatus according to the present invention, the non-linear spring is configured by a plurality of serially-coupled springs; the springs include a limiter that prevents deformation when a predetermined load is exceeded; and the larger the total load of the non-linear spring, the fewer the number of springs that contribute to the deformation. In the measuring apparatus according to the present invention, the non-linear spring is configured by arranging a plurality of springs so as to be coupled in parallel; the springs include a coupling portion that couples to another linear spring when the amount of deformation exceeds a threshold value; and the larger the total amount of deformation of the non-linear spring, the greater the number of springs that contribute to the load. In the measuring apparatus according to the present invention, the controller calculates a target amount of deformation based on the target load and the non-linear spring characteristic data, and drives the actuator so as to modulate an amount of deformation equivalent to a difference between the target amount of deformation and a present amount of deformation of the non-linear spring as measured by the scale. In the measuring apparatus according to the present invention, the controller calculates a present load based on the non-linear spring characteristic data and the present amount of deformation of the non-linear spring as measured by the scale, and drives the actuator so as to add and output a load equivalent to a difference between the target load and the present load.

The present invention is able to provide a measuring apparatus that presses an indenter against a material surface and evaluates material characteristics, where the measuring apparatus, utilizing deformation of a spring, can control force over a broad range with a high degree of accuracy, and yet is compact.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
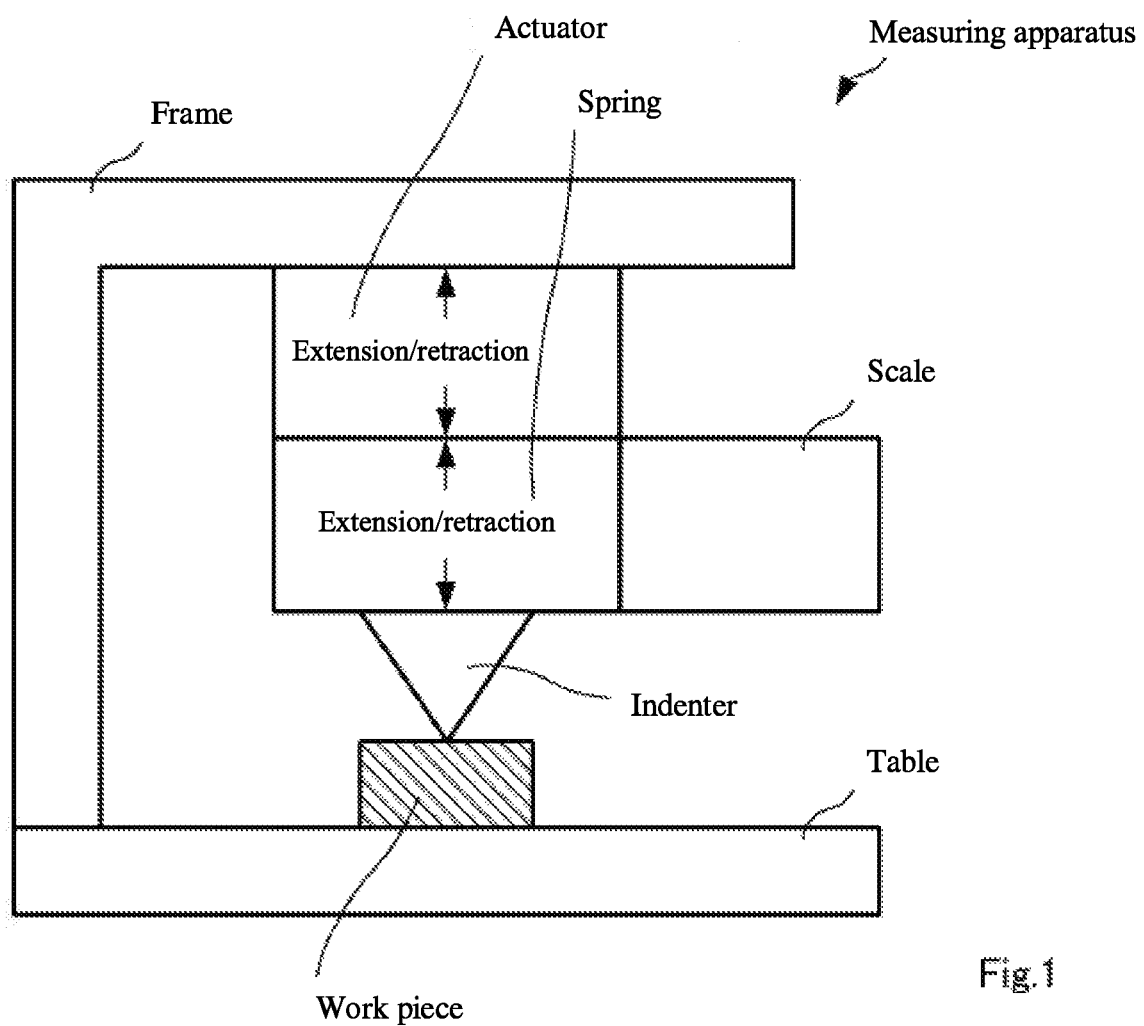
FIG. 1 is a schematic view illustrating an exemplary conventional measuring apparatus.
Figure 2:
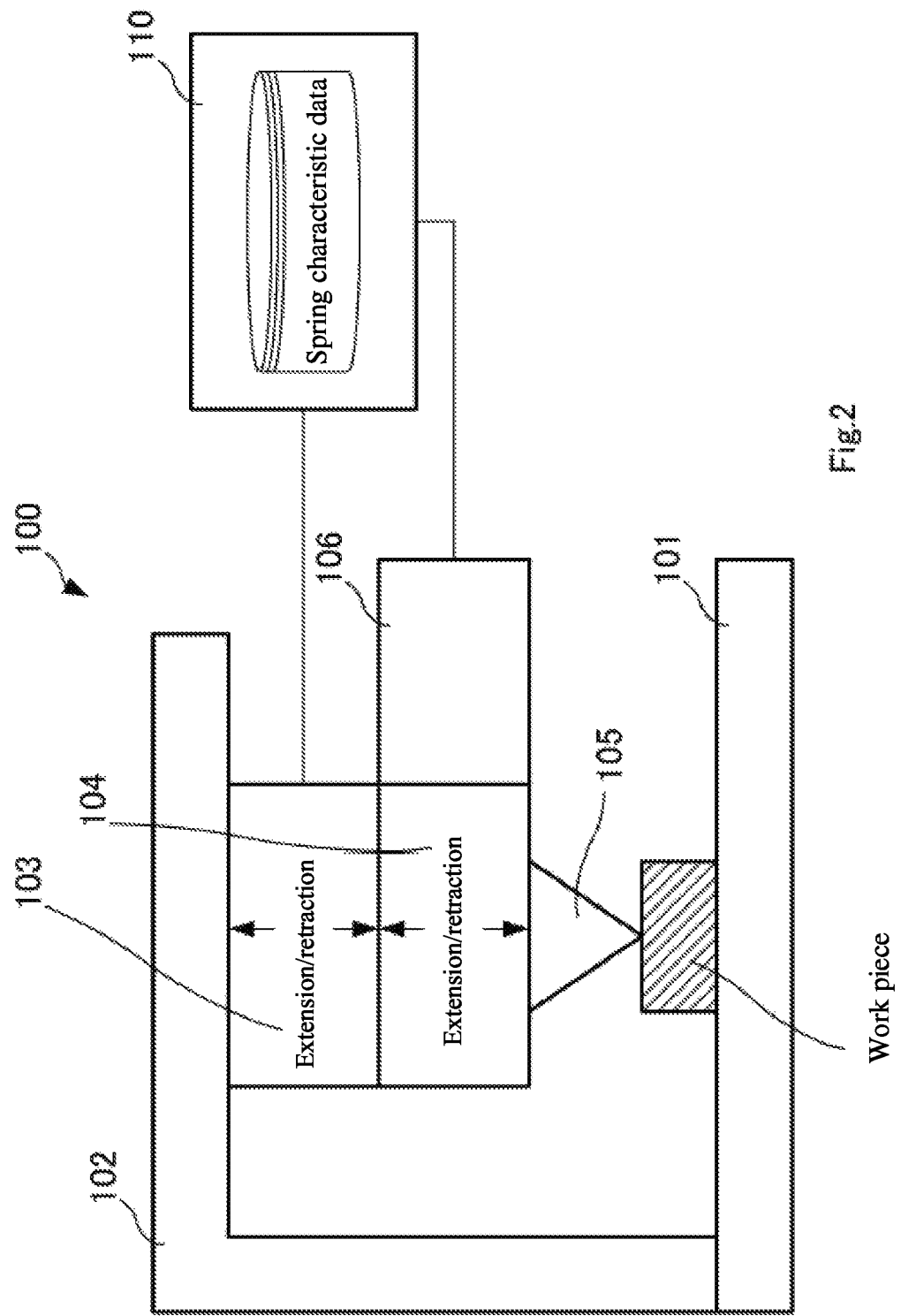
FIG. 2 is a schematic view illustrating an exemplary measuring apparatus 100 according to embodiments of the present invention.

Hereafter, the present invention is applied to concrete embodiments, which are described in detail with reference to the drawings. First, using the schematic view of FIG. 2, the configuration of a measuring apparatus 100 according to embodiments of the present invention is described. The measuring apparatus 100 includes a stage 101 on which a work piece is placed; a frame 102 that extends to the rear of the work piece as viewed from the stage 101; an actuator 103 that is supported by the frame 102; a spring 104 with a first end touching the actuator 103 and a second end holding an indenter 105; a scale 106 measuring deformation of the spring 104; and a controller 110 controlling driving of the actuator 103.

The actuator 103 and the spring 104 are arranged such that an extension/retraction axis of each coincides with the other. The spring 104 and the indenter 105 displace toward a surface of the work piece in conjunction with extension of the actuator 103, and when the indenter 105 finally presses against the surface of the work piece, the spring 104 deforms from its initial shape (free length). The scale 106 measures the amount of deformation of the spring 104 at this point. Methods of measuring the amount of deformation include an indirect method, which measures the shape of a spring (for example, the length of the spring) before and after deformation and calculates the difference, and a direct method (for example, coupling a slider of a scale to the extension/retraction of the spring), which measures the amount of deformation (for example, the amount of extension/retraction of the spring). However, any method may be used. Even in cases where the work piece is deformed or displaced due to a load, the indenter 105 that presses against the surface of the work piece follows the surface of the work piece more or less constantly due to the deformation of the spring 104.

The controller 110 stores spring characteristic data. The spring characteristic data is data indicating a relationship between the amount of deformation of the spring 104 and the force generated by the spring 104 (that is, the load the indenter 105 applies to the work piece). The controller 110 monitors the amount of deformation of the spring 104 that is measured by the scale 106. For example, the controller 110 acquires a measured value for each fixed period of time. Then, the controller 110 calculates the load based on the spring characteristic data and the measured value for the amount of deformation of the spring 104.

In the simplest terms, so long as the spring 104 is a single spring that obeys a spring constant and deforms linearly in response to a load, the spring characteristic data of the spring 104 can be expressed by a spring coefficient. In such a case, the controller 110 can calculate the load applied to the work piece by multiplying the spring constant by a present amount of deformation of the spring, which is obtained by subtracting the measured value acquired by the scale 106 from the initial shape (free length) of the spring 104. (This example is provided merely for purposes of explaining what is meant by "spring characteristic data." As noted below, a non-linear spring is adopted as the spring 104 in the embodiments of the present invention. The spring characteristic data for such a case will also be non-linear.)

The controller 110 provides a target load, which is the load to be provided to the work piece. For example, using an inputter that is not shown in the drawings, a user inputs the target load. Alternatively, a target load that is output from an external device may be input to the controller 110 via a communication interface or the like.

Typically, while performing the calculation process for the load as described above at fixed intervals, the controller 110 controls the actuator 103 so as to achieve the target load. When the actuator 103 is a length specification type (for example, a type configured by a ball screw+stepping motor, or a ball screw+scale+servo motor, that specifies a displacement distance of an actuator and provides drive), the controller 110 performs control such as the following:
(1) Convert the Target Load into a Target Amount of Deformation.

Based on the spring characteristic data, the controller 110 calculates the amount of deformation of the spring 104 required (target amount of deformation) in order to achieve the target load.
(2) Move the Actuator 103 by (Target Amount of Deformation—Present Amount of Deformation).

The controller 110 calculates the difference between the target amount of deformation and the measured value for the amount of deformation of the spring 104 obtained by the scale 106 (present amount of deformation). The positive/negative sign of the difference corresponds to the direction in which the actuator is moved (for example, extended or retracted). Accordingly, ignoring deformation or the like of the work piece, the spring 104 is expected to deform and reach the target amount of deformation. If the work piece deforms or the like and the spring 104 does not reach the target amount of deformation, the controller 110 re-executes the process of (2). When the amount of deformation of the work piece can be predicted, the predicted amount of deformation of the work piece may be added to the difference from (2) to move the actuator 103. When there is no allowance for exceeding the target load, either the amount of deformation of the work piece is not added, or the amount of deformation of the work piece may be estimated conservatively by multiplying by a predetermined coefficient, for example.

Meanwhile, when the actuator 103 is a force specification type (for example, a type configured by a voice coil that generates a force proportional to an electric current, and that specifies a load to be output by an actuator and provides drive), the controller 110 performs control such as the following:
(1) Convert the Present Amount of Deformation into a Present Load.

Based on the spring characteristic data, the controller 110 calculates a load (present load) that corresponds to the measured value for the amount of deformation of the spring 104 obtained by the scale 106 (present amount of deformation).
(2) Drive the Actuator 103 Such that the Load Increases by (Target Load—Present Load)

The controller 110 calculates the difference between the target load and the present load. The positive/negative sign of the difference corresponds to the direction in which the actuator is moved (for example, extended or retracted). If the present load does not reach the target load even after the process of (2) due to an error in the actuator 103 or the like, the controller 110 repeats the processes of (1) and (2).

The spring 104 is now described. The indenter 105 that is held by the spring 104 presses straight into the surface of the work piece, and therefore the spring 104 requires a high degree of rigidity with respect to deformation other than the expected deformation (for example, extension/retraction deformation in an extension/retraction direction). A spring capable of meeting this requirement is a spring such as the one illustrated in FIG. 3.

Figure 3:
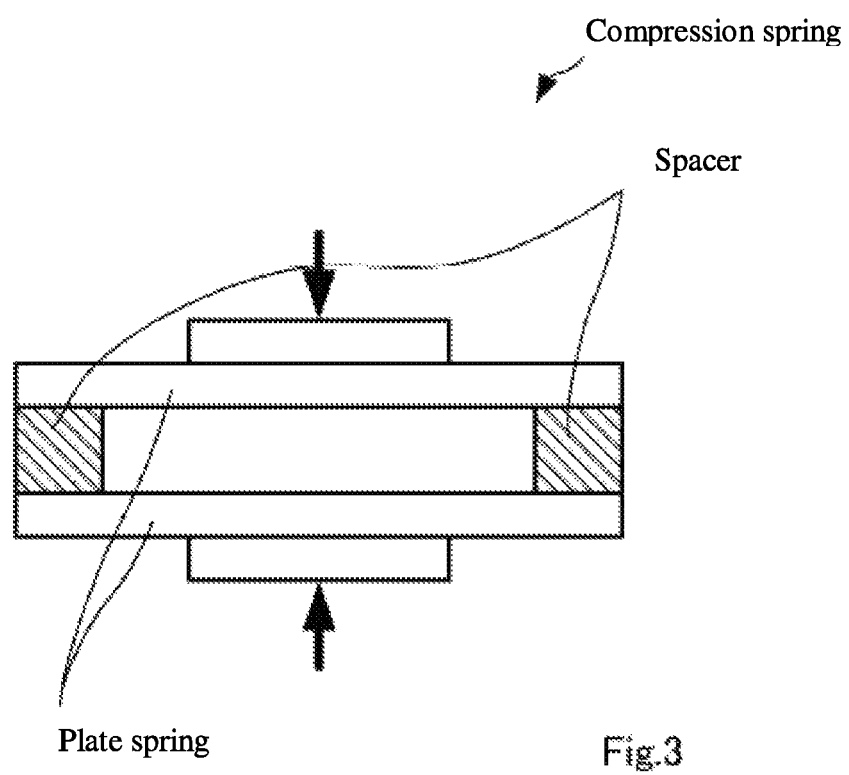
FIG. 3 is a cross-sectional view illustrating a configuration of a compression spring.

FIG. 3 is a cross-sectional view of a compression spring from a lateral direction. The compression spring has two rectangular plate springs stacked on top of each other with a spacer therebetween. The compression spring deforms in accordance with the spring constant in response to a force in the extension/retraction direction illustrated by an arrow. However, even when a force in some other direction is applied, the compression spring is extremely difficult to deform (that is, the compression spring has a high degree of rigidity). In isolation, the compression spring is a linear spring. That is, when a load in the extension/retraction direction is applied, the compression spring deforms linearly in accordance with the spring constant.

A particular feature of the embodiments of the present invention is that a plurality of linear springs having different characteristics are combined to configure a non-linear spring, and this non-linear spring is employed as the spring 104. Also, the controller 110 is configured to store the spring characteristic data specific to the non-linear spring 104 in advance, and performs control of the actuator 103 as described above, using this spring characteristic data. Exemplary configurations of the non-linear spring 104 using the compression spring illustrated in FIG. 3 and exemplary spring characteristic data corresponding to the non-linear springs 104 are disclosed hereafter as embodiments.

First Embodiment

In a first embodiment, the non-linear spring 104 is configured by serially arranging a plurality of linear springs having different spring constants. The structure of the non-linear spring 104 according to the first embodiment is described with reference to FIGS. 4 and 5. Here, "serially" means that a compound spring deformation is the sum of the deformation of each individual spring, and a compound spring load is shared by each individual spring.

Figure 4:
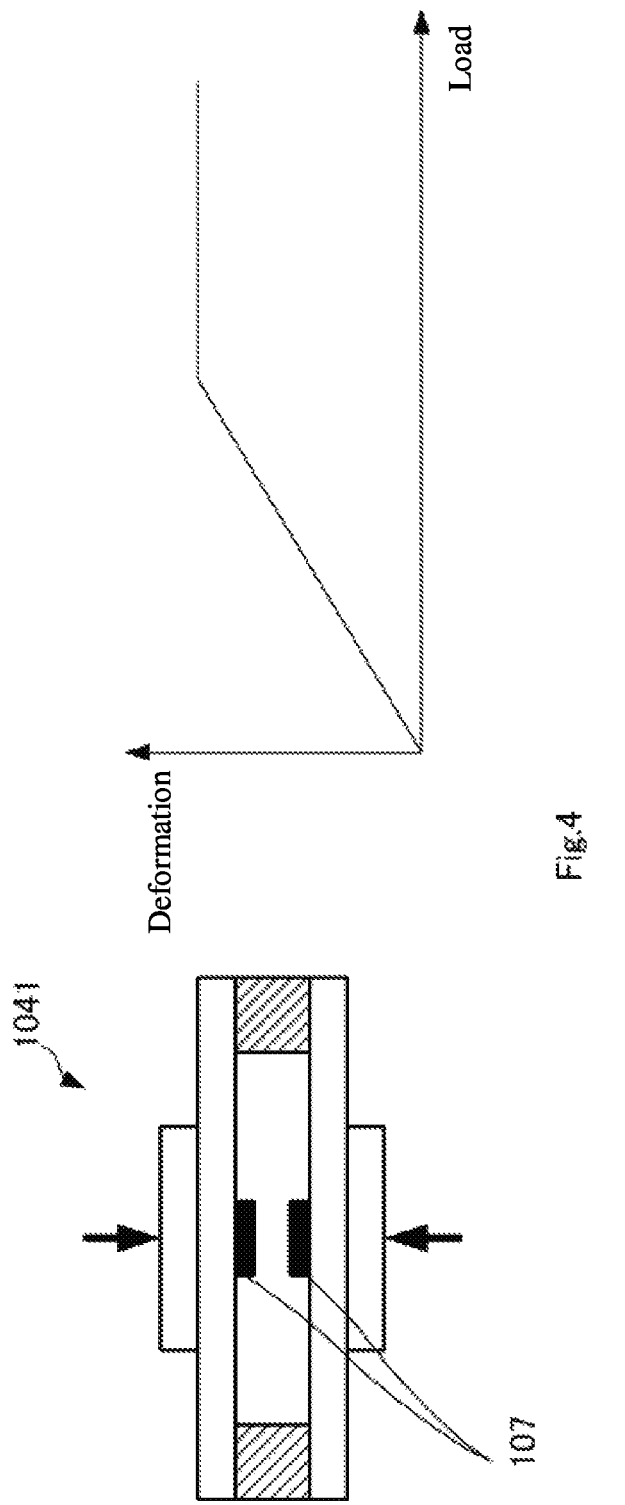
FIG. 4 is a cross-sectional view illustrating a configuration of a compression spring that includes a limiter 107.

The left side of FIG. 4 is a cross-sectional view illustrating the structure of a linear spring 1041, which is a structural element of the non-linear spring 104. The right side of FIG. 4 is a graph illustrating characteristics (changes in the amount of deformation relative to the load) of the linear spring 1041. In the linear spring 1041, a limiter 107 that acts to prevent more than a certain amount of deformation (retraction or shortening) is arranged between two plate springs. When a compressive force (illustrated by arrows) acting on the linear spring 1041 increases, the distance between the two plate springs gradually narrows, but when a certain distance is reached, the limiter 107 interferes and no further deformation occurs.

Figure 5:
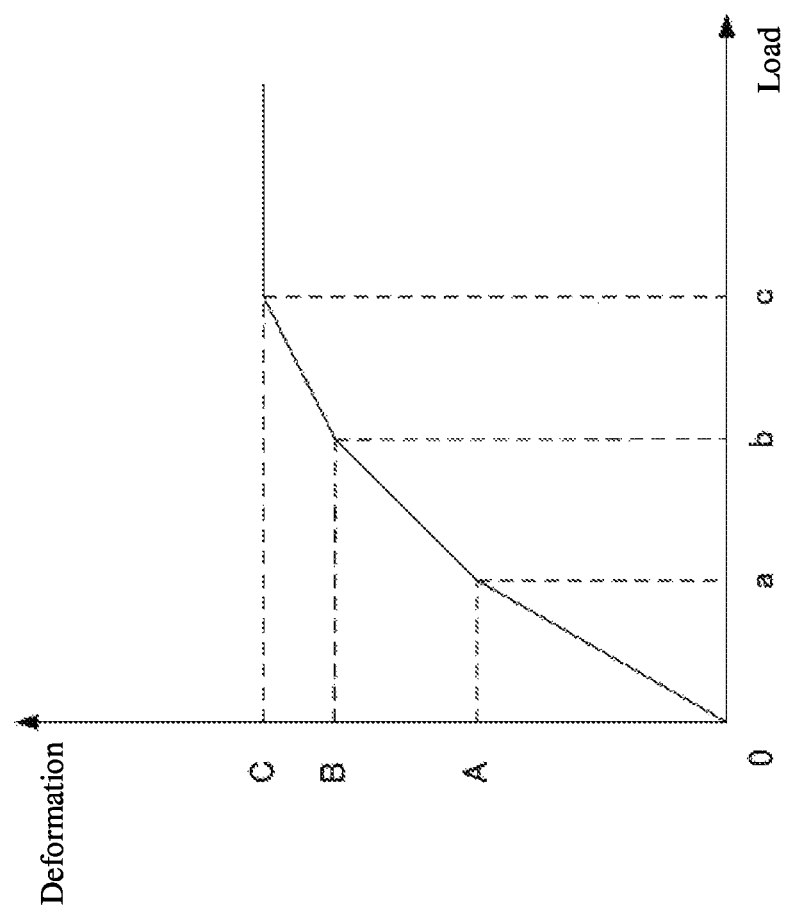
FIG. 5 is a cross-sectional view illustrating an example of a non-linear spring 104.
Figure 5:
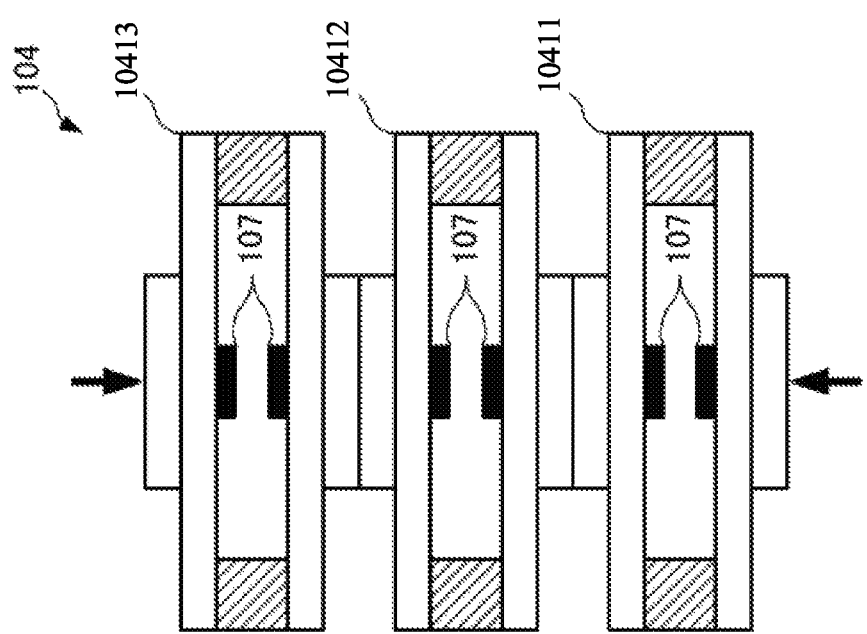

The left side of FIG. 5 is a cross-sectional view illustrating the structure of the non-linear spring 104. In the non-linear spring 104, a plurality of the linear springs 1041 having the structure illustrated in FIG. 4 are stacked on top of each other. The plurality of linear springs 1041 each have a different hardness (spring constant).

As an example, take a non-linear spring 104 in which three linear springs 1041 having different spring constants (that is, three kinds of compression springs: a soft spring 10411, a medium spring 10412, and a hard spring 10413) are stacked on top of each other. The spring constants are configured such that (soft spring 10411<medium spring 10412<hard spring 10413). Characteristics (changes in the amount of deformation relative to the load) of the non-linear spring 104 at this point are illustrated on the right side of FIG. 5. When a compressive force illustrated by arrows is applied to the non-linear spring 104, in a segment where the load is a value from 0 to a, the soft spring 10411, the medium spring 10412, and the hard spring 10413 deform (retract or shorten) together. At a load a, the soft spring 10411 reaches the limiter 107. The total amount of deformation of the non-linear spring 104 at this point is designated A. In a segment where the load is a value from a to b, only the medium spring 10412 and the hard spring 10413 deform. At a load b, the medium spring 10412 reaches the limiter 107. The total amount of deformation of the non-linear spring 104 at this point is designated B. In a segment where the load is a value from b to c, only the hard spring 10413 deforms. At a load c, the hard spring 10413 reaches the limiter 107. The total amount of deformation of the non-linear spring 104 at this point is designated C. In a segment where the load is a value from c onward, all of the linear springs 1041 have reached the limiters 107, and therefore no further deformation occurs. In other words, in this example, as the total load on the non-linear spring 104 increases, the number of linear springs 1041 contributing to the deformation decreases. Also, the sum of the deformations of each linear spring 1041 (10411, 10412, and 10413) constitutes the total deformation of the non-linear spring 104.

The characteristics (changes in the amount of deformation relative to the load) of the non-linear spring 104, illustrated by a thick line on the right side of FIG. 5, are stored by the controller 110 as the spring characteristic data. The controller 110 may also, for example, store separate formulas for straight lines illustrating the characteristics of the non-linear spring 104 in each load region (a load from 0 to a, from a to b, from b to c, and from c onward) and/or in each amount of deformation region (an amount of deformation from 0 to A, from A to B, from B to C, and from C onward). Alternatively, the controller 110 may store, in a table or some other format, data for which a correspondence relationship between the load and the amount of deformation is defined. When the amount of deformation is known, the shape after deformation can be known based on the initial shape (free length), and therefore the controller 110 can reference such a formula or table and calculate the shape that corresponds to the load, or the load that corresponds to the shape, of the non-linear spring 104.

The placement order of the soft spring 10411, the medium spring 10412, and the hard spring 10413 does not affect the characteristics of the non-linear spring 104. However, from a perspective of ensuring rigidity, a harder linear spring 1041 is preferably placed closer to the actuator 103 and a softer linear spring 1041 is preferably placed farther from the actuator 103. In other words, in order from the nearest to the actuator 103, the placement order is preferably the hard spring 10413, the medium spring 10412, and the soft spring 10411, with the soft spring 10411 holding the indenter 105.

Second Embodiment

In a second embodiment, the non-linear spring 104 is configured by parallel coupling a plurality of linear springs 1042 having different spring constants. The structure of the non-linear spring 104 according to the second embodiment is described with reference to FIGS. 6 and 7. Here, "in parallel" means that a compound spring force is the sum of the force of each individual spring, and a compound spring deformation is shared by each individual spring.

Figure 6:
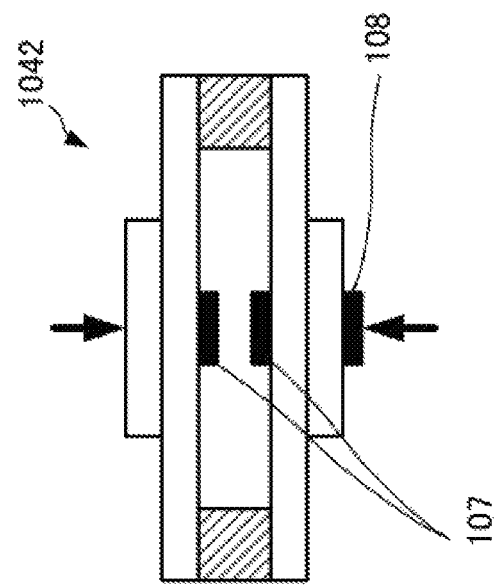
FIG. 6 is a cross-sectional view illustrating examples of the non-linear spring 104.
Figure 6:
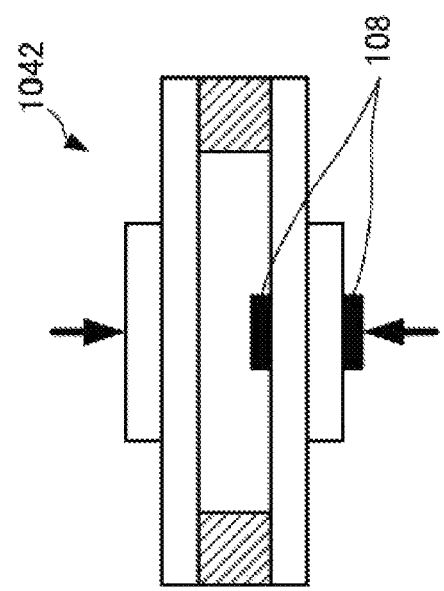

FIG. 6 is a cross-sectional view illustrating the structure of the linear spring 1042, which is a structural element of the non-linear spring 104. A coupling portion (coupler) 108 is arranged on the linear spring 1042, the coupling portion 108 touching another linear spring 1042 and transmitting a load (left and right sides of FIG. 6). The limiter 107 that acts to prevent more than a certain amount of deformation (retraction or shortening) may be arranged in the linear spring 1042, as well (right side of FIG. 6).

Figure 7:
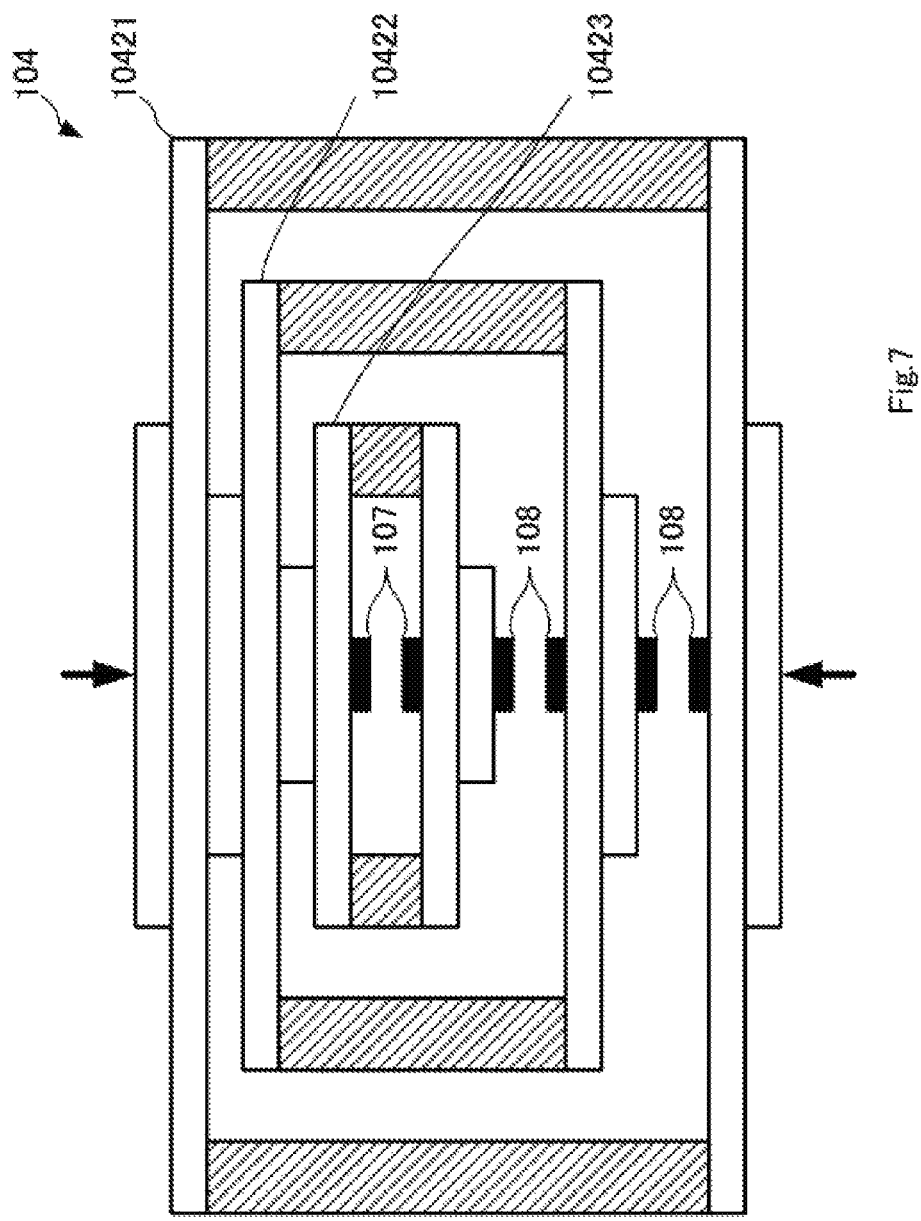
FIG. 7 is a cross-sectional view illustrating an example of the non-linear spring 104.

FIG. 7 is a cross-sectional view illustrating an example of the structure of the non-linear spring 104 according to the second embodiment. In the non-linear spring 104, a plurality of the linear springs 1042 having the structure illustrated in FIG. 6 are combined in parallel and nesting within each other. In this case also, the plurality of linear springs 1042 each have a different hardness (spring constant). In the example of FIG. 7, three kinds of linear spring 1042 are nested within each other (in order from the outermost: a soft spring 10421, a medium spring 10422, and a hard spring 10423). The linear springs 1042 are each configured to have a pre-deformation shape (free length) in an initial state. The pre-deformation shape (free length) of each compression spring has a length in the order of (soft spring 10421>medium spring 10422>hard spring 10423). Therefore, there is a certain amount of play between each linear spring 1042 (10421, 10422, and 10423).

When a load illustrated by arrows is applied to the non-linear spring 104, first the soft spring 10421 alone deforms (retracts or shortens) and absorbs the load. When a further load is added and deformation advances, the soft spring 10421 and the medium spring 10422 touch, with the coupling portion 108 of each interposed therebetween, and the soft spring 10421 and the medium spring 10422 both deform (retract or shorten) and absorb the load. When a further load is added and deformation advances, the medium spring 10422 and the hard spring 10423 touch, with the coupling portion 108 of each interposed therebetween, and the soft spring 10421, the medium spring 10422, and the hard spring 10423 all deform (retract or shorten) and absorb the load. In this way, as the load increases and deformation advances, the non-linear spring 104 according to the second embodiment exhibits a characteristic where the number of linear springs 1042 deforming (retracting or shortening) and absorbing the load increases and the spring constant increases. Also, the sum of the loads absorbed by each linear spring 1042 (10421, 10422, and 10423) constitutes the total load absorbed by the non-linear spring 104.

As in the first embodiment, the controller 110 can be configured to store the characteristics of the non-linear spring 104 in advance using a formula, table, or any other desired format. Accordingly, the controller 110 can reference the formula, table, or the like and calculate the amount of deformation corresponding to the load, or the load corresponding to the amount of deformation, of the non-linear spring 104.

The measuring apparatus 100 according to the present embodiment includes the non-linear spring 104, which has the characteristic of becoming softer (lower spring constant) while deformation is small and harder (higher spring constant) as deformation increases. A single non-linear spring 104 covers a broad range of spring constants, and therefore measurement of materials of various hardnesses can be performed particularly while accuracy in controlling a load during contact between the indenter and the work piece, for example, and an ability to follow the surface of the work piece are maintained. In addition, the measuring apparatus 100 can be reduced in size and design constraints can be minimized. In other words, by changing a linear spring of the conventional technology for the non-linear spring 104 and adapting the measuring apparatus 100 to non-linear characteristics, the range of forces that can be controlled can be broadened and the kinds of work pieces that can be measured can be diversified without making the measuring apparatus 100 larger. The relative accuracy of a force can be kept substantially uniform for small forces up to large forces, and therefore material characteristics such as a broad range of hardnesses can be measured with a high degree of accuracy.

In addition, in the present embodiment, by simply coupling the linear springs, which can be readily manufactured, the non-linear spring 104 can be manufactured both easily and at a low cost. Also, linear springs having a high level of rigidity with respect to unexpected deformation can be coupled, and therefore a similar level of rigidity can be ensured in the non-linear spring 104, as well. Furthermore, the relationship between the characteristics of a linear spring that forms the basis of the non-linear spring 104 and the characteristics of the non-linear spring 104 is comparatively simple, and therefore a non-linear spring 104 having the desired characteristics can be readily designed. Moreover, a linear spring that forms the basis of the non-linear spring 104 can be designed and manufactured with so-called "worn-out" technology, and therefore a high degree of accuracy can be expected, and since the linear springs are coupled in a simple way to create the non-linear spring 104, a high degree of accuracy can also be expected in the non-linear spring 104. Also, by combining the linear springs in a nesting fashion, the non-linear spring 104 according to the second embodiment is extraordinarily compact.

Moreover, the present invention is not limited to the embodiments described above, and may be modified as needed without departing from the scope of the present invention. For example, in the embodiments described above, an example is given of a configuration where a load is transmitted to the work piece from the spring 104 via the indenter 105. However, the present invention is not limited to this, and a force generated by the spring 104 may also be communicated indirectly to the work piece via any desired mechanism, such as a lever.

Also, in the embodiments described above, examples are given of the non-linear spring 104 being configured by arranging a plurality of linear springs serially or in parallel. However, the present invention is not limited to this, and the serial and parallel arrangements of the plurality of linear springs may also be combined to configure the spring 104.

Also, in the embodiments described above, examples are primarily given where compression springs are employed as an example of the plurality of linear springs that configure the non-linear spring 104. However, the present invention is not limited to this, and any desired kind of spring (for example, a plate spring) may be employed as the linear spring that configures the non-linear spring 104.

Furthermore, the springs that are coupled together serially or in parallel in the spring 104 need not be linear springs. The springs may instead be substantially linear springs. A movable range of the spring constant may be further broadened by intentionally employing springs having non-linear characteristics (for example, a variable pitch coil, a taper coil, or the like). Also, the spring 104 can also be configured by a single non-linear spring.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness measuring apparatus that evaluates a hardness of a material surface, the hardness measuring apparatus comprising:
   a non-linear spring comprising a plurality of nested springs coupled in parallel, in which a spring constant of the non-linear spring increases as an amount of deformation of the non-linear spring increases, and in which the deformation generates a load that presses an indenter against the material surface;
   an actuator that causes the non-linear spring to deform;
   a scale that measures the amount of deformation of the non-linear spring when the non-linear spring is deformed; and
   a controller that
      stores non-linear spring characteristic data for reciprocally calculating the amount of deformation and the load,
      drives the actuator based on the amount of deformation and the non-linear spring characteristic data such that the load reaches a target load and the indenter is pressed against the material surface, and
      determines the hardness of the material surface based on a result of pressing the indenter against the material surface.

2. The hardness measuring apparatus according to claim 1, wherein:
   the plurality of springs includes a limiter that prevents deformation of a spring when a predetermined load is exceeded.

3. The hardness measuring apparatus according to claim 1, wherein:
   the plurality of springs includes a coupler that couples to another spring of the plurality of springs when the amount of deformation exceeds a threshold value, and
   the larger the total amount of deformation of the plurality of springs, the greater the number of said springs that contribute to the total load of the plurality of springs.

4. The hardness measuring apparatus according to claim 1, wherein the controller:
   calculates a target amount of deformation based on the target load and the non-linear spring characteristic data, and
   drives the actuator so as to shift a distance that is equivalent to a difference between the target amount of deformation and a present amount of deformation of the non-linear spring as measured by the scale.

5. The hardness measuring apparatus according to claim 1, wherein the controller:

calculates a present load based on the non-linear spring characteristic data and a present amount of deformation of the non-linear spring as measured by the scale, and drives the actuator so as to additionally output a load equivalent to a difference between the target load and the present load.

* * * * *